(12) United States Patent
Chura

(10) Patent No.: US 6,343,152 B1
(45) Date of Patent: Jan. 29, 2002

(54) BI-LEVEL IMAGE COMPRESSION BY GRAY SCALE ENCODING

(75) Inventor: David Chura, Redondo Beach, CA (US)

(73) Assignee: Peerless Systems Corporation, CA (US)

(*) Notice: Subject to any disclaimer, the term of this patent is extended or adjusted under 35 U.S.C. 154(b) by 0 days.

(21) Appl. No.: 08/827,155

(22) Filed: Mar. 27, 1997

Related U.S. Application Data

(63) Continuation of application No. 08/324,682, filed on Oct. 18, 1994.

(51) Int. Cl.[7] .............................. G06K 9/36; H04N 1/41; H04N 1/415
(52) U.S. Cl. .................. 382/237; 358/429; 358/433
(58) Field of Search ................................. 358/429, 433, 358/426, 455, 456, 459, 460, 430, 448, 467, 470; 341/98, 106, 56; 382/232, 237

(56) References Cited

U.S. PATENT DOCUMENTS

| | | | | |
|---|---|---|---|---|
| 4,075,663 A | * | 2/1978 | Wellendorf | 358/283 |
| 4,369,463 A | * | 1/1983 | Anastassiou | 358/430 |
| 4,677,571 A | * | 6/1987 | Riseman et al. | 364/519 |
| 5,113,455 A | * | 5/1992 | Scott | 358/451 |
| 5,140,648 A | * | 8/1992 | Hackett et al. | 382/47 |
| 5,264,942 A | * | 11/1993 | Shimotsuji | 358/433 |
| 5,303,313 A | * | 4/1994 | Mark et al. | 358/430 |
| 5,323,247 A | * | 6/1994 | Parker et al. | 358/456 |
| 5,416,857 A | * | 5/1995 | Chen et al. | 358/430 |
| 5,432,870 A | * | 7/1995 | Schwartz | 358/432 |
| 5,535,277 A | * | 7/1996 | Shibata et al. | 380/28 |
| 5,680,129 A | * | 10/1997 | Weinberger et al. | 341/65 |
| 5,704,020 A | * | 12/1997 | Hanyu et al. | 395/102 |
| 5,715,329 A | * | 2/1998 | Murata | 382/166 |

\* cited by examiner

*Primary Examiner*—Madeleine Nguyen
(74) *Attorney, Agent, or Firm*—Blakely Sokoloff Taylor & Zafman

(57) ABSTRACT

A method and apparatus for the compression of complex bi-level images created from gray scale images. The invention has particular application when used with continuous raster scan output devices such as laser printers where the invention enables the printing of images using a smaller amount of memory than would be needed without the invention. To practice the invention, a bi-level gray scale image is produced by any desired technique. The gray scale image is then rendered thereby converting it to a bi-level image. The bi-level image is compressed in portions The compressed portions are then decompressed and the decompressed portions are sent to a print engine of a continuous raster scan device at the speed required by the print engine so that it is never necessary to have the entire image stored in the printer's memory at the same time.

12 Claims, 2 Drawing Sheets

BI-LEVEL IMAGE COMPRESSION BY GRAY SCALE ENCODING

This is a continuation of application Ser. No. 08/324,682 filed Oct. 18, 1994.

BACKGROUND OF THE INVENTION

The invention is in the field of digital image compression with specific application in connection with image compression for continuous raster scan output devices such as laser printers, although other uses such as facsimile transmission are also possible. The invention relates in particular to bi-level image compression. A bi-level image refers to a digitized image in which each pixel is either 1 or 0 meaning ON or OFF. It is suitable for line-art and text and, in many cases for gray scale and color images as well where the display device is not capable of displaying gray scale or color images respectively.

Prior art techniques for compressing bi-level images include:

Relative Element Address Designate (READ) algorithms which are lossless encodings of bi-level images. READ algorithms encode the transitions from 0 bits to 1 bits using the relative address of each transition. Compression occurs since runs of all-0 or all-1 are commonly encountered in text or line-art documents and thus there are relatively few transitions. Modified versions of READ are standardized by the CCITT and known as Group 3 (G3) and Group 4 (G4). G3 and G4 standards are common in fax machines and document storage devices. Since READ is a lossless algorithm, the achieved compression is dependent upon the image itself. It is well known that complicated documents including photographic-like images are not compressed well by READ; often the compressed size is larger than the original.

The Joint Bi-level Image Expert Group (JBIG) has proposed a compression standard to address the shortcomings of CCITT G3/G4 in handling photographic-like images known as Progressive Bi-Level Image Compression. This is a lossless standard which addresses the same type of images expected to do well using the invented techniques. The JBIG algorithm sequentially (or progressively) codes bits in an image based upon the bits immediately before and above the current bit. Although there are no known implementations of this algorithm, it is reported to achieve good compression on documents that will grow under CCITT G3/G4. However, it is also reported to be approximately three times more compute intensive than G3/G4. Since JBIG is a lossless algorithm, the achieved compression is dependent upon the image itself.

The Joint Photographic Experts Group (JPEG) has introduced a lossy/lossless compression standard for gray-scale and color images. This standard is in common use for multi-level images and achieves good quality in its lossy mode at the expense of significant computational complexity. The complexity arises from the use of the Discrete Cosine Transform and a complicated encoding process. It is this complexity that precludes the JPEG algorithm from use in certain applications. The invented technique attempts to avoid this complexity.

Another bi-level image compression technique is known as resolution reduction. Resolution reduction algorithms are generally ad-hoc methods for encoding bi-level images to achieve a lossy compression. However, all are based upon the idea that a high-resolution image may be approximated by a lower resolution version. Compression occurs because a lower resolution image is smaller. Resolution reduction is done in many ways, including low-pass filtering, line drop and bit approximation as described below.

In low-pass filtering, the image is re-sampled by a low pass filter to a lower resolution. Decompression replicates each bit in the low-resolution image in two dimensions.

In line drop compression, scanlines from an original image are dropped completely, thus compressing the image. Decompression replicates the kept scanlines. This is essentially a one-dimensional low-pass filter, but is computationally more efficient than traditional low-pass filtering.

In bit approximation compression, the bit-pattern of a scanline is approximated by a table of values, where the table attempts to match the bits as closely as possible. This is generally done on very small bit patterns (e.g., 4–8 bits).

SUMMARY OF THE INVENTION

A method and apparatus are disclosed for the compression of complex bi-level images referred to herein as Gray-scale Encoding Compression (GEC). GEC is a lossy compression technique that retains good image quality with limited computation complexity over moderate compression ratios. GEC strives to regenerate the original image's shades of gray. No attempt is made to capture the bit patterns in the original image; instead, GEC captures the gray-scale content in the image. Upon decompression, the decompressed image has the same gray-scale content as the original, but typically will have a completely different bit map. GEC compression always produces a compressed image which is smaller than the original image. The compression is lossy since the actual bit-patterns regenerated do not match the original, although in many cases the regenerated image will appear to be of comparable quality as the original.

GEC has particular application when used with continuous raster scan output devices such as laser printers where the invention enables the printing of images using a smaller amount of memory than would be needed without GEC. The reason this advantage is obtained is because continuous raster scan output devices expect an entire page to be available at a speed required by the print engine. To accomplish this, without GEC or other compression, the entire image to be printed must exist in its bi-level image format in the printer's memory. The present invention overcomes this requirement allowing larger images (i.e., bi-level images with many black pixels) to be printed without as much memory as would otherwise be needed.

DETAILED DESCRIPTION OF THE INVENTION

Figure 1:
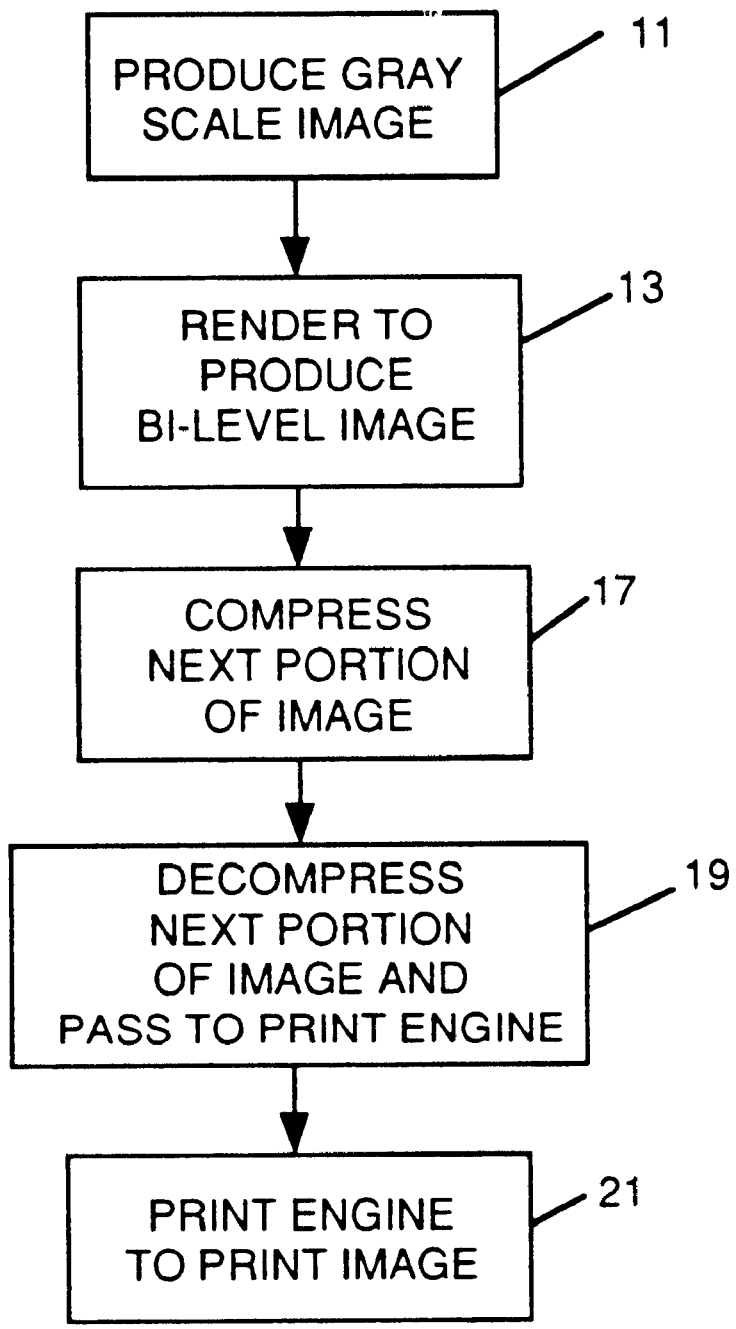
FIG. 1 is a block diagram showing one system in which the invented GEC may be employed.

Gray-scale encoding compression (GEC) is a lossy compression technique for use with gray scale images. GEC differs from prior art compression techniques in that it does not strive to regenerate the original image's bit patterns, but instead strives to regenerate the original image's shades of gray. No attempt is made to capture the bit patterns in the original image; instead, GEC captures the gray-scale content in the image. Upon decompression, the decompressed image has the same gray-scale content as the original, but typically will have a completely different bit map. GEC compression always produces a compressed image which is smaller than the original image. The compression is technically lossy since the actual bit-patterns regenerated do not match the original. In fact, as previously noted, the regenerated bit patterns are often quite different from those of the original. However, since the technique accurately regenerates the gray-scale content of the image, the resulting subjective quality is very good.

The GEC works due in large part to human perception of high resolution. Studies of human eye-brain perception suggest that humans do not see the detail in an image based upon the actual bit-patterns, but are sensitive to the change and gradation of gray scale perceived to be on the page (for example, Carley, Adam L, Ph.D. "Resolution Enhancement in Laser Printers" 1993 Dataquest) GEC discards the image bit-patterns in favor of capturing the gray scale content. Given that the gray scale information is more important than the actual bit patterns, GEC will regenerate images with good perceived quality. In photographic images studied, the actual bit-patterns in the decompressed image are very different from the original, yet side-by-side comparison of images compressed with resolution-reduction algorithms proved image quality is better using GEC even though it regenerates fewer correct bits. i.e., bits which have the same value as corresponding bits in the original image.

A popular technique for transferring photographic images to bi-level (e.g., for images to be printed on a device having just two output levels) is a process called halftoning. In this process, the photographic image is first converted to its gray-scale equivalent. Each pixel in the original image is transformed into a single halftone cell, where that cell generates the desired shade of gray on a bi-level image. As is well known, a halftone cell that is n bits tall by m bits wide can recreate (n*m)+1 shades of gray (the +1 includes white). Many variations on the placement, size, and shapes of cells in a halftoning process are in use today. GEC parallels the halftoning process (i.e., the GEC process chooses cell size and shape in a similar manner used by traditional halftoning techniques). Thus, good performance would be expected on GEC of halftoned images.

There are two forms of GEC: the standard and progressive modes. The standard mode requires that the compression ratio be chosen in advance. The progressive mode starts compressing at the lowest level (2 to 1) and then can recursively compress to higher compression ratios. Both of these forms are derived from the same compression and decompression techniques.

Referring to FIG. 1, a gray scale image is produced 11 by any desired technique such as by scanning a photograph and storing the scanned image as a gray scale image, i.e., where each pixel has a value from 0 to n with 0 representing white and n representing black and n/2 representing fifty (50%) percent gray. There are n shades of gray including white but excluding black, or n+1 shades of gray including white and black. The gray scale image is then rendered—hereby converting it to a bi-level image. Again various prior art techniques are available for rendering to a bi-level image. For example, Adobe's Postscript language and Hewlett-Packard's PCL Printer Language produce bi-level images suitable for laser printer output. In practice, when a Postscript printer is connected to a personal computer, and a user requests that a gray scale image be sent to the printer, a driver in the personal computer converts the gray scale image to a set of Postscript commands and sends the generated Postscript commands as a Postscript file to the printer which converts the Postscript file to a bi-level image which is sent to the print engine for output. It should be noted that the conversion of the Postscript file to a bi-level image could also take place in the personal computer. When a PCL printer is connected to the personal computer, the appropriate driver in the personal computer converts the gray scale image to a bi-level image which is then sent to the printer.

In both cases, so long as the printer has enough memory to store the entire bi-level image, the print job proceeds and the printed output is generated. However, a complex gray scale image, i.e., a gray scale image with a large number of different shades of gray, can generate a bi-level image which cannot fit in the available printer memory. Since laser printers and other continuous scan raster devices must complete the output of a page once it has been started, if there is not enough memory to store the entire image, the print job fails.

With use of the present invention, instead of sending the bi-level image directly to the print engine, the bi-level image is compressed 17 in portions as it is received (or prior to being sent) from the personal computer (for PCL printers) or from the Postscript interpreter (for Postscript printers). The compressed portions are then decompressed 19 and the decompressed portions are sent to the print engine 21 at the speed required by the print engine so that it is never necessary to have the entire image stored in the printer's memory at the same time.

Figure 2:
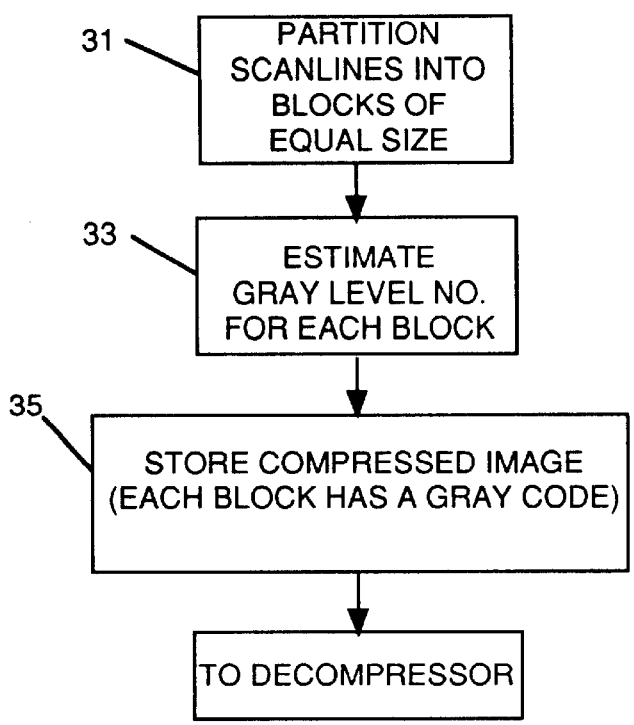
FIG. 2 is a block diagram showing the compression processing performed by the invention.

Further details concerning the compression performed by the present invention will now be described with reference to FIG. 2.

1. Partition 31 the image into n-by-m bit blocks, where n and m are chosen as described below with reference to Table I.

2. For each n-by-m bit block, estimate 33 its gray scale content using, for example, the ratio of black (0) to white (1) bits. The ratio can be determined by simply counting the number of black (or white) bits since the total number of bits (n*m) in each block is known. For example, for n equal 4 and m equal 4, each block contains 16 bits. If there are 4 bits which are 0, the ratio is 4:12. Since only the number of black bits is retained, and since 4 (or any number up to 15) can be represented in 4 bits, there is a 4:1 compression obtained. If all 16 bits are 0 or black, this gray scale code is still represented in 4 bits by encoding it as 15. With current laser print engine technology, black bits (i.e., pixels), which are represented by a physical piece of black toner, are always larger than white bits, which are represented by the white or other color of the paper stock being used for printing. For this reason, it is preferable to determine the ratio of black bits to white bits more intelligently to compensate for the larger black pixel size as follows. Within the block, the total area covered by black is computed to form a better estimate of gray scale. This is done by summing the actual amount of black covered by the larger black pixels and subtracting the amount of black that overlaps between adjacent black pixels.

The following C language routine may be used to perform a fine grid determination of gray scale for a 4×4 block. The routine assumes black dots have twice the area of white dots. It calculates the total area of black dots, subtracting for dot overlap.

```
const long t4t08_overlap_0[16] =
{
    0x00000000,   0x000000FF,   0x0000FF00,   0x0000FFFF,
    0x00FF0000,   0x00FF00FF,   0x00FFFF00,   0x00FFFFFF,
    0xFF000000,   0xFF0000FF,   0xFF00FF00,   0xFF00FFFF,
    0xFFFF0000,   0xFFFF00FF,   0xFFFFFF00,   0xFFFFFFFF
};
const long t4to8_overlap_1[16] =
{
    0x00000000,   0x800001FF,   0x0001FF80,   0x8001FFFF,
    0x01FF8000,   0x81FF81FF,   0x01FFFF80,   0x81FFFFFF,
    0xFF800001,   0xFF8001FF,   0xFFFC3FFC3,  0xFFFFFFFF,
    0xFFFF8001,   0xFFFF81FF,   0xFFFFFF81,   0xFFFFFFFF
};
const long t4to8_overlap_2[16] =
{
    0x00000000,   0xC00003FF,   0x0003FFC0,   0xC003FFFF,
    0x03FFC000,   0xC3FFC3FF,   0x03FFFFC0,   0xC3FFFFFF,
    0xFFC00003,   0xFFC003FF,   0xFFC3FFC3,   0xFFC3FFFF,
    0xFFFFC003,   0xFFFFC3FF,   0xFFFFFFC3,   0xFFFFFFFF
};
const long t4to8_smear_overlap_1[16] =
{
    0x00000000,   0x0000007E,   0x00007E00,   0x00007FFE,
    0x007E0000,   0x007E00FF,   0x007FFE00,   0x007FFFFE,
    0x7E000000,   0xFE00007F,   0x7E007E00,   0xFE007FFF,
    0x7FFE0000,   0xFFFE007F,   0x7FFFFE00,   0xFFFFFFFF
};
const char bitcnt[16] = { 0,1,1,2,1,2,2,3,1,2,2,3,2,3,3,4 };
long estimate_gray_level_2x(char c0, char c1, char c2, char c3)
{
    long level;
    long fine[32];
    long pat;
    int i;
    for (i = 0; i < 32; i++)
        fine[i]   = 0;
    level = 0;
    if (c0 != 0)
    {
        pat = t4to8_overlap_0[c0];
        fine[8]   |= pat;
        fine[31]  |= pat;
        pat = t4to8_smear_overlap_1[c0];
        fine[9]   |= pat;
        fine[30]  |= pat;
        pat = t4to8_overlap_1[c0];
        fine[0]   |= pat;
        fine[7]   |= pat;
        pat = t4to8_overlap_2[c0];
        for (i = 1; i< 7; i++)
            fine[1]  |= pat;
    }
    if (c1 != 0)
    }
    {
        pat = t4to8_overlap_0[c1];
        fine[7]   |= pat;
        fine[16]  |= pat;
        pat = t4to8_smear_overlap_1[c1];
        fine[6]   |= pat;
        fine[17]  |= pat;
        pat = t4to8_overlap_1[c1];
        fine[8]   |= pat;
        fine[15]  |= pat;
        pat = t4to8_overlap_2[c1];
        for (i = 9; i< 15; 1++)
            fine[i]  |= pat;
    }
    if (c2 != 0)
    {
        pat = t4to8_overlap_0[c2];
        fine[15]  |= pat;
        fine[24]  |= pat;
        pat = t4to8_smear_overlap_1[c2];
        fine[14]  |= pat;
        fine[25]  |= pat;
        pat = t4to8_overlap_1[c2];
        fine[16]  |= pat;
        fine[23]  |= pat;
```

-continued

```
        pat = t4to8_overlap_2[c2];
        for (i = 17; 1< 23; i++)
            fine[i]  |= pat;
    }
    if (c3 != 0)
    {
        pat = t4to8_overlap_0[c3];
        fine[23]  |= pat;
        fine[0]   |= pat;
        pat = t4t08_smear_overlap_1[c3];
        fine[22]  |= pat;
        fine[1]   |= pat;
        pat = t4to8_overlap_1[c3];
        fine[24]  |= pat;
        fine[31]  |= pat;
        pat = t4to8_overlap_2[c3];
        for (i = 25; 1< 31; i++)
            fine[1]  |= pat;
    for (i = 0; 1 < 32; i++)
    {
        long word;
        word += fine[1];
        level += bitcnt[ word         & 0xF] +
                 bitcnt[(word >>  4) & 0xF] +
                 bitcnt[(word >>  8) & 0xF] +
                 bitcnt[(word >> 12) & 0xF] +
                 bitcnt[(word >> 16) & 0xF] +
                 bitcnt[(word >> 20) & 0xF] +
                 bitcnt[(word >> 24) & 0xF] +
                 bitcnt[(word >> 28) & 0xF]);
    }
    return level;
}
```

Additionally, since larger black pixels will overflow into adjacent blocks, the amount of overflow is added to the block's black area calculation. Any overflow from another block that overlaps black in the block is subtracted. However, with this technique, for a 4 by 4 pixel block, the gray scale encoded number still ranges from 0 to 15 which can be represented in 4 bits.

Since there are known to be (n*m)+1 possible grays in each block, the gray scales are coded to be the numbers 0 to n*m. The resulting compression ratio is the number of original bits (n*m) divided by the $\log_2$ number of bits required to store the gray scale code:

$$\text{compression ratio} = \frac{(n*m)}{\log_2((n*m)+1)} \quad [1]$$

If the block extends beyond the image at any point, the block itself is truncated meaning that instead of the number of original bits being n*m, it is some smaller number. Various well known techniques are available for determining the edge of an image. For example, suppose the image is 107 bits wide by 103 bits tall and n=10, m=10. The top of the image would be partitioned into 11 blocks, 10 of which are 10 by 10 and the rightmost one which is 7 by 10. This is repeated nine more times until the bottom edge of the image is partitioned. The bottom edge consists of 10 blocks which are 10 by 3 and the rightmost one which is 7 by 3 (this is the lower right edge of the image). The image is thus partitioned into 121 blocks.

3. Store 35 the generated gray-scale codes for all blocks and discard the original image.

Selection of n and m allows control over compression ratio and computational complexity by trading off quality. This is done by eliminating gray scales in the output (i.e. reducing the quality) until the most efficient values (efficient in terms of fast implementation on a general-purpose computer) of n and m are met. For example, suppose the most efficient implementation requires n and m to each be equal to 4. From equation 1, this has a compression ratio of $16/\log_2(17)=16/5=3.2$. Eliminating one gray scale (from 17 to 16) changes the ratio to $16/4=4.0$. The following n/m pairs are recommended:

TABLE I

| Ratio | n | m | Code Bits | Comment |
|---|---|---|---|---|
| 2:1 | 2 | 2 | 2 | dropped 1 gray (from 5 to 4) |
| 4:1 | 4 | 4 | 4 | dropped 1 gray (from 17 to 16) |
| 5:1 | 5 | 5 | 5 | no grays dropped, 7 spare codes |
| 8:1 | 8 | 8 | 8 | no grays dropped |
| 10:1 | 8 | 8 | 6 | dropped 1 gray (from 65 to 64) |

The compression of the image takes place continuously with n lines of the image being passed to the decompressor as soon as the number of pixels in each scan line/m has been converted. For [ex]ample, for a 600 dpi image which is to be printed within a page having a print width of 8 inches using a 4:1 compression ratio (n=4, m=4), there are 4800 dots or pixels per scan line or 1200 blocks. In this case, 1200 n*m blocks of compressed image data are sent to the decompressor at a time and then the next set of blocks are processed.

Figure 3:
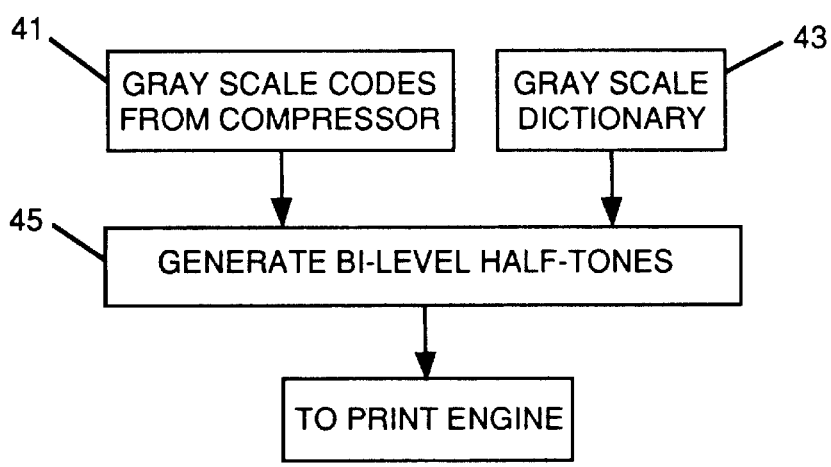
FIG. 3 is a block diagram showing the decompression processing performed by the invention.

Decompression will now be described with reference to FIG. 3. Decompression takes the stored gray scale codes 41 passed by the compressor and uses a gray-scale dictionary 43 and a correction map or table 45 processing each set of blocks as they are received. That is, each block is converted from its gray scale code to an n*m block. The dictionary 43 contains representations for all GEC shades of gray. It is realized as a table of (n*m)+1 entries, where each entry is an n*m block of bits. The correction map 45 identifies the mapping between the GEC gray-scale codes 41 and dictionary shades of gray. Its purpose is to correct for possible deficiencies in the regenerated output (or output device). Decompression requires the following steps:

1. Retrieve the gray-scale code 41 for each block. For each code, look up the gray-scale entry in the dictionary 43 through the correction map 45. The correction map provides an index into the gray-scale dictionary. The specifics for implementing dictionary 43 are set forth below. The correction map 45 may be implemented using as a table look-up in software or in a PLA or using an application-specific integrated circuit. For example, using the 5:1 compression, the following table II identifies two possible mappings, one that corrects for dark images (i.e., lightens) and one that corrects for high contrast images (i.e., lowers contrast):

TABLE II

| Map Index | Lighter | Lower Contrast |
|---|---|---|
| 0 | 0 | 0 |
| 1 | 1 | 2 |
| 2 | 1 | 4 |
| 3 | 1 | 6 |
| 4 | 2 | 7 |
| 5 | 3 | 8 |
| 6 | 4 | 9 |
| 7 | 5 | 9 |
| 8 | 6 | 10 |
| 9 | 7 | 11 |
| 10 | 8 | 11 |
| 11 | 9 | 12 |

TABLE II-continued

| Map Index | Lighter | Lower Contrast |
|---|---|---|
| 12 | 10 | 12 |
| 13 | 11 | 13 |
| 14 | 12 | 13 |
| 15 | 13 | 14 |
| 16 | 14 | 14 |
| 17 | 15 | 15 |
| 18 | 16 | 16 |
| 19 | 17 | 16 |
| 20 | 18 | 17 |
| 21 | 19 | 18 |
| 22 | 20 | 19 |
| 23 | 21 | 21 |
| 24 | 22 | 23 |
| 25 | 25 | 25 |

The specific details for correction maps for other compression ratios should be readily apparent to one skilled in the art. The compression encoding is independent of the gray-scale dictionary. The correction map is used to correct for idiosyncrasies in a particular output device. It may be changed on a per-device or per image basis.

2. Store the blocks and discard the codes/dictionary/map. For example, in a laser printer application, the blocks are stored in a buffer that is used to drive the laser print engine.

Given a compression block of n-by-m bits, the gray-scale dictionary has a size in bits given by:

$$\text{dictionary bitsize} = (n*m)^2 + (n*m) \quad [2]$$

and the size of the correction map in bits is:

$$\text{correction map bitsize} = ((n*m)+1) * \log_2 ((n*m)+1) \quad [3]$$

In general, the gray-scale dictionary is not stored with a compressed image, but the correction map may be. For images of interest (those large enough to require compression), the size of the map has a negligible impact on the overall compression ratio.

The preferred implementation (where black dots have twice the area of white dots) uses the following dictionaries (where each block is described from top to bottom and Ox indicates hexadecimal notation):

2x2 Block (only the lower 2 bits of each digit are used):
    0x0, 0x0 /* Gray Level 00 */
    0x2, 0x0 /* Gray Level 01 */
    0x2, 0x1 /* Gray Level 02 */
    0x3, 0x3 /* Gray Level 03 */
4x4 Block:
    0x0, 0x0, 0x0, 0x0 /* Gray Level 00 */
    0x8, 0x0, 0x0, 0x0 /* Gray Level 01 */
    0x8, 0x0, 0x2, 0x0 /* Gray Level 02 */
    0x8, 0x8, 0x2, 0x0 /* Gray Level 03 */
    0x8, 0x8, 0x2, 0x2 /* Gray Level 04 */
    0xC, 0x8, 0x2, 0x2 /* Gray Level 05 */
    0xC, 0x8, 0x3, 0x2 /* Gray Level 06 */
    0xC, 0xC, 0x3, 0x2 /* Gray Level 07 */
    0xC, 0xC, 0x3, 0x3 /* Gray Level 08 */
    0xC, 0xC, 0xB, 0x3 /* Gray Level 09 */
    0xE, 0xC, 0xB, 0x3 /* Gray Level 10 */
    0xE, 0xC, 0xF, 0x3 /* Gray Level 11 */
    0xF, 0xC, 0xF, 0x3 /* Gray Level 12 */
    0xF, 0xC, 0xF, 0xB /* Gray Level 13 */
    0xF, 0xE, 0xF, 0xB /* Gray Level 14 */
    0xF, 0xF, 0xF, 0xF /* Gray Level 15 */
5x5 Block (only lower 5 bits of each digit are used):
    0x00, 0x00, 0x00, 0x00, 0x00, /* 0 */

-continued

```
    0x00, 0x00, 0x00, 0x02, 0x00, /*  1 */
    0x00, 0x08, 0x00, 0x02, 0x00, /*  2 */
    0x00, 0x08, 0x00, 0x02, 0x02, /*  3 */
    0x00, 0x08, 0x08, 0x02, 0x02, /*  4 */
    0x00, 0x08, 0x08, 0x03, 0x02, /*  5 */
    0x00, 0x0C, 0x08, 0x03, 0x02, /*  6 */
    0x00, 0x0C, 0x08, 0x07, 0x02, /*  7 */
    0x00, 0x1C, 0x08, 0x07, 0x02, /*  8 */
    0x00, 0x1C, 0x0A, 0x07, 0x02, /*  9 */
    0x08, 0x1C, 0x0A, 0x07, 0x02, /* 10 */
    0x08, 0x1C, 0x0A, 0x07, 0x06, /* 11 */
    0x08, 0x1C, 0x1A, 0x07, 0x06, /* 12 */
    0x08, 0x1C, 0x1A, 0x07, 0x07, /* 13 */
    0x08, 0x1C, 0x1E, 0x07, 0x07, /* 14 */
    0x08, 0x1C, 0x1F, 0x07, 0x07, /* 15 */
    0x0C, 0x1C, 0x1F, 0x07, 0x07, /* 16 */
    0x1C, 0x1C, 0x1F, 0x07, 0x07, /* 17 */
    0x1C, 0x1C, 0x1F, 0x07, 0x0F, /* 18 */
    0x1E, 0x1C, 0x1F, 0x07, 0x0F, /* 19 */
    0x1E, 0x1D, 0x1F, 0x07, 0x0F, /* 20 */
    0x1E, 0x1D, 0x1F, 0x17, 0x0F, /* 21 */
    0x1E, 0x1F, 0x1F, 0x17, 0x0F, /* 22 */
    0x1E, 0x1F, 0x1F, 0x1F, 0x0F, /* 23 */
    0x1F, 0x1F, 0x1F, 0x1F, 0x0F, /* 24 */
    0x1F, 0x1F, 0x1F, 0x1F, 0x1F, /* 25 */
8x8 Block:
    0x00, 0x00, 0x00, 0x00, 0x00, 0x00, 0x00, 0x00 /* 00 */
    0x80, 0x00, 0x00, 0x00, 0x08, 0x00, 0x00, 0x00 /* 01 */
    0x80, 0x80, 0x00, 0x00, 0x08, 0x08, 0x00, 0x00 /* 02 */
    0x80, 0x80, 0x00, 0x00, 0x08, 0x08, 0x00, 0x00 /* 03 */
    0x80, 0x80, 0x00, 0x00, 0x08, 0x0C, 0x00, 0x00 /* 04 */
    0x80, 0xC0, 0x00, 0x00, 0x08, 0x0C, 0x00, 0x00 /* 05 */
    0x80, 0xC0, 0x00, 0x00, 0x0C, 0x0C, 0x00, 0x00 /* 06 */
    0xC0, 0xC0, 0x00, 0x00, 0x0C, 0x0C, 0x00, 0x00 /* 07 */
    0xC0, 0xC0, 0x00, 0x00, 0x1C, 0x0C, 0x00, 0x00 /* 08 */
    0xC1, 0xC0, 0x00, 0x00, 0x1C, 0x0C, 0x00, 0x00 /* 09 */
    0xC1, 0xC0, 0x00, 0x00, 0x1C, 0x1C, 0x00, 0x00 /* 10 */
    0xC1, 0xC1, 0x00, 0x00, 0x1C, 0x1C, 0x00, 0x00 /* 11 */
    0xC1, 0xC1, 0x00, 0x00, 0x1C, 0x1C, 0x08, 0x00 /* 12 */
    0xC1, 0xC1, 0x80, 0x00, 0x1C, 0x1C, 0x08, 0x00 /* 13 */
    0xC1, 0xC1, 0x80, 0x00, 0x1C, 0x1C, 0x0C, 0x00 /* 14 */
    0xC1, 0xC1, 0xC0, 0x00, 0x1C, 0x1C, 0x0C, 0x00 /* 15 */
    0xC1, 0xC1, 0xC0, 0x00, 0x1C, 0x1E, 0x0C, 0x00 /* 16 */
    0xC1, 0xE1, 0xC0, 0x00, 0x1C, 0x1E, 0x0C, 0x00 /* 17 */
    0xC1, 0xE1, 0xC0, 0x00, 0x1E, 0x1E, 0x0C, 0x00 /* 18 */
    0xE1, 0xE1, 0xC0, 0x00, 0x1E, 0x1E, 0x0C, 0x00 /* 19 */
    0xE1, 0xE1, 0xC0, 0x04, 0x1E, 0x1E, 0x0C, 0x00 /* 20 */
    0xE1, 0xE1, 0xC0, 0x04, 0x1E, 0x1E, 0x0C, 0x40 /* 21 */
    0xE1, 0xE1, 0xC0, 0x0C, 0x1E, 0x1E, 0x0C, 0x40 /* 22 */
    0xE1, 0xE1, 0xC0, 0x0C, 0x1E, 0x1E, 0x0C, 0xC0 /* 23 */
    0xE1, 0xE1, 0xC0, 0x0C, 0x1E, 0x1E, 0x1C, 0xC0 /* 24 */
    0xE1, 0xE1, 0xC1, 0x0C, 0x1E, 0x1E, 0x1C, 0xC0 /* 25 */
    0xE1, 0xE1, 0xC1, 0x0C, 0x1E, 0x1E, 0x1E, 0xC0 /* 26 */
    0xE1, 0xE1, 0xE1, 0x0C, 0x1E, 0x1E, 0x1E, 0xC0 /* 27 */
    0xE1, 0xE1, 0xE1, 0x0E, 0x1E, 0x1E, 0x1E, 0xC0 /* 28 */
    0xE1, 0xE1, 0xE1, 0x0E, 0x1E, 0x1E, 0x1E, 0xC0 /* 29 */
    0xE1, 0xE1, 0xE1, 0x0E, 0x1E, 0x1E, 0x1E, 0xE0 /* 30 */
    0xE1, 0xE1, 0xE1, 0x1E, 0x1E, 0x1E, 0x1E, 0xE0 /* 31 */
    0xE1, 0xE1, 0xE1, 0x1E, 0x1E, 0x1E, 0x1E, 0xE1 /* 32 */
    0xE1, 0xE1, 0xE1, 0x1E, 0x1E, 0x1E, 0x1E, 0xF1 /* 33 */
    0xE1, 0xE1, 0xE1, 0x1F, 0x1E, 0x1E, 0x1E, 0xF1 /* 34 */
    0xE1, 0xE1, 0xF1, 0x1F, 0x1E, 0x1E, 0x1E, 0xF1 /* 35 */
    0xE1, 0xE1, 0xF1, 0x1F, 0x1E, 0x1E, 0x1F, 0xF1 /* 36 */
    0xE1, 0xE1, 0xF3, 0x1F, 0x1E, 0x1E, 0x1F, 0xF1 /* 37 */
    0xE1, 0xE1, 0xF3, 0x1F, 0x1E, 0x1E, 0x3F, 0xF1 /* 38 */
    0xE1, 0xE1, 0xF3, 0x1F, 0x1E, 0x1E, 0x3F, 0xF3 /* 39 */
    0xE1, 0xE1, 0xF3, 0x3F, 0x1E, 0x1E, 0x3F, 0xF3 /* 40 */
    0xF1, 0xE1, 0xF3, 0x3F, 0x1E, 0x1E, 0x3F, 0xF3 /* 41 */
    0xF1, 0xE1, 0xF3, 0x3F, 0x1F, 0x1E, 0x3F, 0xF3 /* 42 */
    0xF1, 0xF1, 0xF3, 0x3F, 0x1F, 0x1E, 0x3F, 0xF3 /* 43 */
    0xF1, 0xF1, 0xF3, 0x3F, 0x1F, 0x1F, 0x3F, 0xF3 /* 44 */
    0xF1, 0xF1, 0xFB, 0x3F, 0x1F, 0x1F, 0x3F, 0xF3 /* 45 */
    0xF1, 0xF1, 0xFB, 0x3F, 0x1F, 0x1F, 0xBF, 0xF3 /* 46 */
    0xF1, 0xF1, 0xFF, 0x3F, 0x1F, 0x1F, 0xBF, 0xF3 /* 47 */
    0xF1, 0xF1, 0xFF, 0x3F, 0x1F, 0x1F, 0xFF, 0xF3 /* 48 */
    0xF1, 0xF3, 0xFF, 0x3F, 0x1F, 0x1F, 0xFF, 0xF3 /* 49 */
    0xF1, 0xF3, 0xFF, 0x3F, 0x1F, 0x3F, 0xFF, 0xF3 /* 50 */
    0xF3, 0xF3, 0xFF, 0x3F, 0x1F, 0x3F, 0xFF, 0xF3 /* 51 */
    0xF3, 0xF3, 0xFF, 0x3F, 0x3F, 0x3F, 0xFF, 0xF3 /* 52 */
    0xF3, 0xF3, 0xFF, 0x3F, 0x3F, 0x3F, 0xFF, 0xF7 /* 53 */
    0xF3, 0xF3, 0xFF, 0x3F, 0x3F, 0x3F, 0xFF, 0xF7 /* 54 */
    0xF3, 0xF3, 0xFF, 0x7F, 0x3F, 0x3F, 0xFF, 0xF7 /* 55 */
    0xF3, 0xF3, 0xFF, 0x7F, 0x3F, 0x3F, 0xFF, 0xFF /* 56 */
    0xF3, 0xF3, 0xFF, 0xFF, 0x3F, 0x3F, 0xFF, 0xFF /* 57 */
    0xF3, 0xF7, 0xFF, 0xFF, 0x3F, 0x3F, 0xFF, 0xFF /* 58 */
    0xF3, 0xF7, 0xFF, 0xFF, 0x3F, 0x7F, 0xFF, 0xFF /* 59 */
    0xF7, 0xF7, 0xFF, 0xFF, 0x3F, 0x7F, 0xFF, 0xFF /* 60 */
    0xF7, 0xF7, 0xFF, 0xFF, 0x7F, 0x7F, 0xFF, 0xFF /* 61 */
    0xFF, 0xF7, 0xFF, 0xFF, 0xFF, 0x7F, 0xFF, 0xFF /* 62 */
    0xFF, 0xF7, 0xFF, 0xFF, 0xFF, 0x7F, 0xFF, 0xFF /* 63 */
    0xFF, 0xFF, 0xFF, 0xFF, 0xFF, 0xFF, 0xFF, 0xFF /* 64 */
```

It should be noted that the decompression process is computationally very simple and can be easily implemented in hardware. The continuous movement of the page in a laser print engine requires that the decompressed image be computed as quickly as is needed to keep up with that movement. Since the GEC decompression algorithm is deliberately simple, GEC decompression can be done fast enough for many commercially available print engines using moderate computer resources.

It should be noted that when halftone cells used to create the bi-level image at step 13 above and the compression blocks (used to code the gray-scale at step 33 above) match in size and are exactly aligned, the output quality is best. However, in general, the cells and blocks will not match in size nor alignment since the details of the halftoning process are not known to GEC. Nonetheless, several observations on poorly mismatched blocks/cells still result in superior output when compared to other compression techniques.

On laser printers, the black ink dots are generally larger than the equivalent white dots (lack of ink) and thus small areas of white are obscured. Because of this effect, GEC images tend to appear darker than the original when printed. Thus, the default GEC process includes a correction map that performs a lightening of the image for slightly better output quality.

As described above, the invented GEC techniques do not define any compression of the gray-scale codes themselves. For many images, it is possible that the sequence of codes has enough redundancy to be further encoded by run-length, Huffman, or arithmetic code. The specifics by which such additional compression may be realized should be readily apparent to those skilled in the art.

Additionally, given some knowledge of the image itself (e.g. the total number of gray-scales encountered), a better matching dictionary and/or correction map may be built for better looking output or for further compression.

The above description is what is referred to herein as the standard compression technique where the user determines the compression ratio in advance. In the alternate embodiment referred to herein as progressive mode, the user determines the storage size requirements in advance (rather than the compression ratio). Multiple compressed images are stored in the same storage space, however the number and size are not known in advance. Images are compressed and added to the storage space, where each is kept at the highest quality possible for the amount of space available. For example, a fixed storage space might hold four images at 2:1 compression or eight images at 4:1 compression, etc. Equivalently, a fixed storage space might hold one large image at 2:1 compression or one large image at 4:1 compression and a small image at 2:1 compression, etc. In the progressive mode, GEC initially compresses all images to 2:1 and then progressively re-compresses images (to 4:1 and beyond) as required to meet the fixed storage size constraint as new images are added. To accomplish this, GEC enlarges the block (e.g., from 2 by 2 to 4 by 4) thus increasing the compression. Since the smaller blocks are already coded as a gray-scale, the gray-scale value for the larger block is the sum of the gray-scales in the four smaller blocks that comprise it. No decompression of the image and no gray scale coding is required, thus the progression is very efficient.

In practice, when using progressive mode (as well as standard GEC), the bi-level image is sent to the print engine and is printed directly without compression if there is sufficient memory to hold the entire image. However, if there is insufficient memory to hold the entire image, instead of rejecting the print job as would be the case in the prior art, the portion of the image which has been received is compressed at a 2:1 compression ratio. The remaining portion of the bi-level image is then received and compressed at a 2:1 ratio if possible. (Although, in theory, the remainder of the image can be stored in memory uncompressed if sufficient memory is available, the print output results may not be satisfactory since one portion of the printed image will be the result of a compression/decompression cycle while a second portion will have been printed without first being compressed by a lossy technique.) If the remaining portion of the image cannot be stored in the memory at a 2:1 compression ratio, the stored portion of the image is again compressed using a higher compression ratio, e.g., 4:1 and the remaining portion of the image is received and stored at the higher compression ratio if possible. The process is repeated until the entire image is stored in compressed form in the available memory and then it is decompressed and sent to the print image at the speed required by the print image.

Although there are many existing lossless encodings for various types of images as described above, GEC can also be performed in a lossless manner where the gray-scale dictionary and block size are chosen exactly for a particular digital halftoning process. Again, the specific manner in which the gray-scale dictionary and block size may be properly chosen should be readily apparent to those skilled in the art.

I claim:

1. A method for encoding a bi-level image which has been created from a gray scale image to enable a resulting image to be printed by a continuous scan raster device having a memory insufficient to store the bi-level image comprising the steps of:
   a) compressing the bi-level image by:
      1) dividing said bi-level image into n-by-m bit blocks where n and m are predetermined values, each of said n-by-m bit blocks having a gray scale content which varies as a function of a number of bits having a 0 value and a number of bits having a 1 value in each of said blocks;
      2) determining for each of a predetermined number of said blocks a value representing said gray scale content, each said determined value requiring less storage than required by its corresponding block;
      3) storing compressed portions using said determined values in a memory;
   b) passing the determined values stored in said memory to a decompressor, said decompressor decompressing the compressed portions at a processing speed required by said continuous scan raster device;
   c) repeating said steps a)(2) to b) until said bi-level image has been compressed in its entirety and decompressed to form said resulting image for printing by said continuous scan raster device.

2. The method defined by claim 1 wherein said decompressing comprises the steps of:
   a) retrieving said determined values from said memory;
   b) for each of said retrieved values, obtaining an index into a gray-scale dictionary using a predetermined correction map;
   c) for each of said obtained indexes, determining a corresponding gray-scale value from said gray-scale dictionary, said gray-scale values being used by said continuous scan raster device to produce an image.

3. The method defined by claim 1 wherein n and m are selected based on a compression ratio as follows:

| RATIO | n | m |
|-------|---|---|
| 2:1   | 2 | 2 |
| 4:1   | 4 | 4 |
| 5:1   | 5 | 5 |
| 8:1   | 8 | 8 |
| 10:1  | 8 | 8. |

4. The method defined by claim 1 wherein said value representing said gray scale content of one of said blocks is determined by counting the number of black bits in said one of said blocks.

5. The method defined by claim 1 wherein said value representing said gray scale content of one of said blocks is determined by counting the number of white bits in said one of said blocks.

6. The method defined by claim 1 wherein said value representing said gray scale content of one of said blocks is determined using the ratio of the number of black bits to white bits in said one of said blocks.

7. The method defined by claim 1 wherein said value representing said gray scale content of one of said blocks is determined by summing the actual amount of black covered by the larger black pixels and subtracting the amount of black that overlaps between adjacent black pixels.

8. A system for encoding a bi-level image to enable the image to be printed by a continuous scan raster device having a memory insufficient to store the image comprising:
   a) means for compressing the bi-level image, said compressing means operating until said bi-level image has been compressed in its entirety, said compressing means including:
      1) means for dividing said bi-level image into n-by-m bit blocks where n and m are predetermined values, each of said n-by-m bit blocks having a gray scale content which varies as a function of a number of bits having a 0 value and a number of bits having a 1 value in each of said blocks;
      2) means for determining for each of a predetermined number of said blocks a value representing said gray scale content, each said determined value requiring less storage than required by its corresponding block;
      3) means for storing compressed portions using said determined values in a memory;
   c) means for passing the compressed portions stored in said memory to a decompressor, said decompressor decompressing the compressed portions at a processing speed required by said continuous scan raster device.

9. A method for encoding a bi-level image which has been created from a gray scale image to enable a resulting image to be printed by a continuous scan raster device having a memory insufficient to store the bi-level image comprising the steps of:

a) compressing the bi-level image by:
  i) dividing said bi-level image into n-by-m bit blocks where n and m are predetermined values, each of said n-by-m bit blocks having a gray scale content which varies as a function of a number of bits having a 0 value and a number of bits having a 1 value in each of said blocks;
  ii) determining for each of a predetermined subset of said blocks a value representing said gray scale content, each said determined value requiring less storage than required by its corresponding block so that the converted predetermined portions are compressed to a 2:1 compression ratio;
  iii) adding the compressed predetermined portions to the storage space;
  iv) re-compressing the predetermined portions at a higher compression ratio if the entire image cannot be stored at the current compression ratio by increasing n and m producing a larger block size to thereby increase the compression ratio wherein by virtue of the smaller blocks being already coded as a gray-scale, the gray-scale value for a larger block is the sum of the gray-scales in the smaller blocks that comprise the larger block;
  v) repeating said steps a) ii)-a)
  iv) until the compressed image is completely contained within said memory;
b) passing the compressed portions of the compressed image in said storage space to a decompressor, said decompressor decompressing the compressed converted portions at a processing speed required by said continuous scan raster device;
c) repeating said step b) until said bi-level image has been decompressed and printed by said continuous scan raster device.

10. A method for encoding a bi-level image which has been created from a gray-scale image, to enable a resulting image to be printed by a continuous scan raster device having a memory insufficient to store the bi-level image, comprising the steps of:
  a) dividing the bi-level image into n-by-m bit blocks where n and m are predetermined values, each of the blocks having a gray-scale content which varies as a function of a number of bits having a 0 value and a number of bits having a 1 value in the block;
  b) determining for a given block a gray-scale code representing the gray-scale content of the block, the code requiring less storage than required by the block so that the block is compressed at a predetermined compression ratio;
  c) decompressing the block using its gray-scale code at a processing speed required by the continuous scan raster device;
  d) repeating steps b and c until the bi-level image has been compressed in its entirety and decompressed to form the resulting image.

11. A method comprising:
  a. receiving a portion of a bi-level image, where each pixel that constitutes the bi-level image has a 1-bit value;
  b. dividing said portion into a plurality of multi-bit blocks;
  c. estimating for each one of the blocks a gray scale value that requires less storage than said one block;
  d. storing in memory a compressed portion of the bi-level image being the estimated gray scale values;
  e. decompressing the stored compressed portion at a processing speed required by a continuous scan master device; and
  f. repeating a.–e. until said bi-level image has been compressed and decompressed in its entirety to form a resulting bi-level image.

12. The method of claim 11 further comprising:
printing the resulting bi-level image.

* * * * *